(12) United States Patent
Sprecher et al.

(10) Patent No.: US 12,397,472 B2
(45) Date of Patent: Aug. 26, 2025

(54) DEVICE AND METHOD FOR ADAPTIVE ROBOTIC STONE SURFACING

(71) Applicant: TECHNION RESEARCH & DEVELOPMENT FOUNDATION LIMITED, Haifa (IL)

(72) Inventors: Aaron Sprecher, Haifa (IL); Tom Shaked, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 899 days.

(21) Appl. No.: 17/393,622

(22) Filed: Aug. 4, 2021

(65) Prior Publication Data

US 2022/0040884 A1 Feb. 10, 2022

Related U.S. Application Data

(60) Provisional application No. 63/060,767, filed on Aug. 4, 2020.

(51) Int. Cl.
| | | |
|---|---|---|
| *B28D 7/00* | (2006.01) |
| *B25J 9/16* | (2006.01) |
| *B25J 11/00* | (2006.01) |
| *B25J 19/02* | (2006.01) |
| *B28D 1/28* | (2006.01) |

(52) U.S. Cl.
CPC ............ *B28D 7/005* (2013.01); *B25J 9/1679* (2013.01); *B25J 11/005* (2013.01); *B25J 19/023* (2013.01); *B28D 1/28* (2013.01)

(58) Field of Classification Search
CPC ...... B25J 19/023; B25J 11/005; B25J 9/1679; B28D 1/28; B28D 7/005
USPC ..................................... 125/23.01
See application file for complete search history.

(56) References Cited

U.S. PATENT DOCUMENTS

2021/0101183 A1\* 4/2021 Sakai .................... B25J 19/023

FOREIGN PATENT DOCUMENTS

JP 2010240809 A \* 10/2010

\* cited by examiner

*Primary Examiner* — Katina N. Henson
(74) *Attorney, Agent, or Firm* — The Roy Gross Law Firm, LLC; Roy D. Gross

(57) ABSTRACT

A device comprising: a bracket adapted to be coupled to a distal end of a robotic arm; a tool holder coupled to said bracket and configured for changeably receiving a first portion of a stone working tool, wherein said tool is movable in a reciprocating axial direction; a driving element for driving said tool distally along said axial direction during a power stroke of said device; and a guiding element for changeably receiving a body portion of said tool and for guiding said tool in said axial direction, wherein said guiding element is configured to resiliently return said tool proximally along said axial direction after said power stroke.

12 Claims, 15 Drawing Sheets

DEVICE AND METHOD FOR ADAPTIVE ROBOTIC STONE SURFACING

CROSS REFERENCE TO RELATED APPLICATIONS

This application claims the benefit of priority under 35 U.S.C. § 119(e) of U.S. Provisional Patent Application No. 63/060,767, filed Aug. 4, 2020, entitled "ADAPTIVE ROBOTIC STONE SURFACING", the contents of which is incorporated herein by reference in its entirety.

FIELD OF THE INVENTION

Applications of the present invention relate generally to an automated adaptive stone working system.

BACKGROUND OF THE INVENTION

Stonework is a longstanding construction tradition, encompassing a multitude of manual tools and techniques for transforming raw material into building elements. Advancements in robotic fabrication allow revisiting these practices using digital tools. However, stonework is complex to automate due to unpredictable material behavior. Therefore, there is a continued demand for skilled stonecarvers to perform custom tasks.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools, and methods which are meant to be exemplary and illustrative, not limiting in scope.

There is provided, in an embodiment, device comprising: a bracket adapted to be coupled to a distal end of a robotic arm; a tool holder coupled to the bracket and configured for changeably receiving a first portion of a stone working tool, wherein the tool is movable in a reciprocating axial direction; a driving element for driving the tool distally along the axial direction during a power stroke of the device; and a guiding element for changeably receiving a body portion of the tool and for guiding the tool in the axial direction, wherein the guiding element is configured to resiliently return the tool proximally along the axial direction after the power stroke.

There is also provided, in an embodiment, a method comprising providing a device comprising: a bracket adapted to be coupled to a distal end of a robotic arm, a tool holder coupled to the bracket and configured for changeably receiving a first portion of a stone working tool, wherein the tool is movable in a reciprocating axial direction, a driving element for driving the tool distally along the axial direction during a power stroke of the device, and a guiding element for changeably receiving a body portion of the tool and for guiding the tool in the axial direction, wherein the guiding element is configured to resiliently return the tool proximally along the axial direction after the power stroke; coupling the device to a distal end of a robotic arm; and operating the robotic arm according to a set of fabrication instructions, to generate a desired surface pattern on a working surface of a stone article.

In some embodiments, the tool is a stone working tool.

In some embodiments, the driving element is one of a: a pneumatic pressure driving element, and an electro-mechanical driving element.

In some embodiments, the guiding element is slidingly reciprocally movable in the axial direction on one or more guide rails.

In some embodiments, the guiding element is resiliently supported by at least one resilient element which returns the driving element proximally in the axial direction.

In some embodiments, the device further comprises one or more sensors selected from the group consisting of: distance sensor, accelerometer, and force sensor.

There is further provided, in an embodiment, a system comprising: at least one hardware processor; a non-transitory computer-readable storage medium having program code embodied therewith, the program code executable by the at least one hardware processor to: receive a target model comprising a desired surface pattern for a working surface of a stone article, receive, from an imaging device, image data depicting the working surface, process the image data to generate a 3D model of a topography of the working surface, calculate a set of fabrication instructions for a fabrication session, based on a comparison between the target model and the 3D model, operate a robotic arm based on the set of fabrication instructions, and iteratively repeat said receiving, processing, calculating, and operating until the 3D model represents the target model.

There is further provided, in an embodiment, a method comprising: receiving a target model comprising a desired surface pattern for a working surface of a stone article; receiving, from an imaging device, image data depicting the working surface, processing the image data to generate a 3D model of a topography of the working surface; calculating a set of fabrication instructions for a fabrication session, based on a comparison between the target model and the 3D model; operating a robotic arm based on the set of fabrication instructions; and iteratively repeating the receiving, processing, calculating, and operating until the 3D model represents the target model.

There is further provided, in an embodiment a computer program product comprising a non-transitory computer-readable storage medium having program instructions embodied therewith, the program instructions executable by at least one hardware processor to: receive a target model comprising a desired surface pattern for a working surface of a stone article; receive, from an imaging device, image data depicting the working surface; process the image data to generate a 3D model of a topography of the working surface; calculate a set of fabrication instructions for a fabrication session, based on a comparison between the target model and the 3D model; operate a robotic arm based on the set of fabrication instructions; and iteratively repeat the receiving, processing, calculating, and operating until the 3D model represents the target model.

In some embodiments, the set of fabrication instruction is calculated to require at least two iterations of the receiving, processing, calculating, and operating.

In some embodiments, the working surface comprises one or more of: a planar region, an incline region, a curvilinear region, a compound curved region, an undulating region, and an irregular surface.

In some embodiments, the robotic arm is coupled to a stone working end effector comprising: a bracket adapted to be coupled to a distal end of a robotic arm; a tool holder coupled to the bracket and configured for changeably receiving a first portion of a stone working tool, wherein the tool is movable in a reciprocating axial direction; a driving element for driving the tool distally along the axial direction during a power stroke of the device; and a guiding element for changeably receiving a body portion of the tool and for guiding the tool in the axial direction, wherein the guiding element is configured to resiliently return the tool proximally along the axial direction after the power stroke.

In some embodiments, each of the fabrication instructions comprises executing one more power strokes by a stone working end effector coupled to the robotic arm, and wherein each of the plurality of power strokes is based on a plurality of power stroke parameters.

In some embodiments, the power stroke parameters are selected from the group consisting of: a spatial position of a tool center point (TCP) of the tool in relation to the working surface; an orientation of the tool in relation to the working surface; a trajectory of the tool in relation to the working surface; an entry angle of the tool; an exit angle of the tool; and a force associated with the power stroke.

In some embodiments, each of the fabrication sessions is based on a plurality of fabrication session parameters selected from the group consisting of: overall fabrication session duration; overall number of the power strokes in the fabrication session; a number of the power strokes per second; average entry angle of the tool in the fabrication session; average exit angle of the tool in the fabrication session; total worked area within the working surface in the fabrication session; and an average speed of the tool during the fabrication session.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1A:
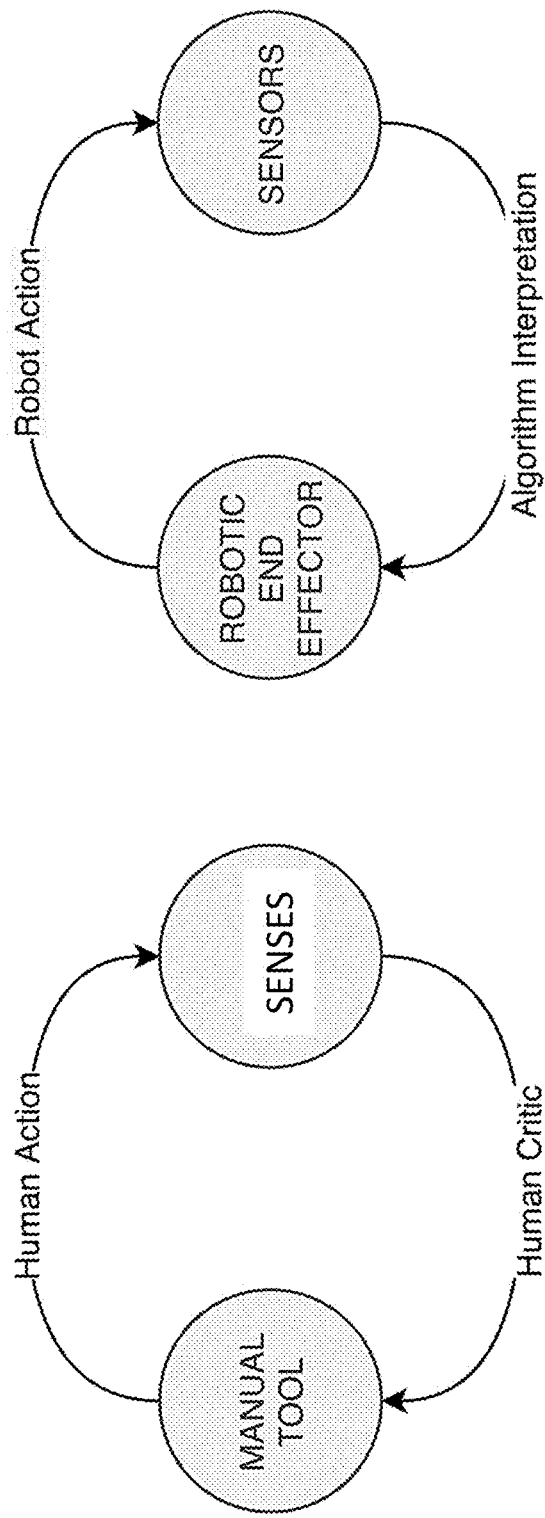
FIG. 1A shows craftsman decision-making process vs. adaptive robotic fabrication protocol.

In accordance with an aspect of the present disclosure, disclosed herein is a device (e.g., a reciprocating end effector) and an associated method for use in conjunction with a robotic arm, to provide for automated stone surfacing, e.g., carving and/or shaping and/or texturing of stone.

In some embodiments, the present device (e.g., the end effector) comprises:
(i) a bracket or housing adapted to be coupled (e.g., as an end effector) to a distal end of a robotic arm;
(ii) a tool holder for changeably receiving and holding a suitable stone working tool, e.g., a chisel;
(iii) a driving element for driving the tool received within the tool holder in power strokes in an axial direction, e.g., by means of pneumatic pressure; and
(iv) a guiding element for changeably receiving a body portion of said tool and for guiding said tool in the axial direction, wherein said guiding element is configured to resiliently return the tool proximally along said axial direction after said power stroke, for example, a reciprocating alignment element which ensures an alignment of the tool along the axial direction, and functions to resiliently return the tool to its initial position after each power stroke.

In some embodiments, the device (e.g., the end effector of the present disclosure) may further comprise, e.g., a vibration reducing element or mechanism configured to reduce a load on the robotic arm caused by vibrations generated by the end effector in operation.

In some embodiments, the device (e.g., the end effector of the present disclosure) may further comprise, e.g., one or more sensors configured for measuring a variety of parameters associated with stone working, such as, but not limited to, a distance to a working surface, a force applied to the end effector in contact with the stone surface, and/or parameters associated with vibrations generated by the end effector in operation. Other sensors may also be included, e.g., an accelerometer.

Accordingly, the present disclosure provides, in some embodiments, an end effector device for mounting or coupling to a distal end of a robotic arm. In some embodiments the end effector device comprises at least (i) an impact tool holder which performs a reciprocating hammering operation by axially moving a tool bit in an axial direction; and (ii) an reciprocal alignment element which aligns and guides the tool bit in the axial direction, and resiliently returns the hammer guide is configured to guide a linear movement of the hammer bit.

In accordance with an aspect of the present disclosure, disclosed herein are a system, method, and computer program product for automated adaptable stone working, incorporating a stone-working end effector of the present disclosure. In some embodiments, the present system comprises, e.g.:
(i) An end effector of the present disclosure as detailed elsewhere herein;

(ii) a robotic arm configured to manipulate the end effector based on one or more desired motion plans;

(iii) an imaging module for continuously or periodically acquiring images of a working surface being treated by the end effector;

(iv) an image processing module for processing the acquired images to generate, continuously or periodically, a 3D model of the working surface;

(v) a robotic motion plan module for calculating one or more motion plans based on a target working surface model and the generated 3D model; and (vi) a control module for operating the robotic arm to carry out the one or more motion plans.

In some embodiments, an adaptive robotic carving system of the present disclosure may comprise (i) a robotic cell consisting of an industrial arm; (ii) a custom end effector of the present disclosure supporting easy tool change in response to various fabrication scenarios, and (iii) custom middleware for adaptive carving employing continuous material sensing enabled by data exchange between the end effector and the sensors.

In some embodiments, an adaptive robotic system of the present disclosure is able to react to new information acquired in real-time, during the actual fabrication process, for example, from sensors included in the system or external to the system. In some embodiments, such a system relies on information from imaging and/or sensors and feedback processes that can react and calculate new instructions for the robotic system on run-time.

In accordance with an aspect of the present disclosure, further disclosed herein are a system, method, and computer program product for generating motion plan modules for an automated adaptable stone working system incorporating a stone-working end effector of the present disclosure, wherein each motion plan module is configured to provide a set of instructions for operating a system of the present disclosure to perform a specified treatment of a stone working surface.

In some embodiments, each motion plan module is based on capturing fabrication parameters associated with a series of subtractive operations performed by a skilled craftsman using traditional tools and methods. The present disclosure then provides for analyzing these fabrication parameters to calculate a plurality of motion plan modules comprising robotic toolpaths which recreate these fabrication operations. In some embodiments, the present method provides for recording discrete pitching-chisel strokes. The single-stroke recording may capture, e.g., the force, position, and orientation of the tool, which may then be converted into robotic actions. This protocol can be extended by documenting and simulating additional tools and techniques.

In some embodiments, the present disclosure provides for combing multiple stone surfacing operations, e.g., detailing, texturizing, and/or surface finishing in subtractive stone manufacturing working using a single robotic tool, based on analyzing traditional stonework practices.

In some embodiments, the present disclosure provides for adaptive robotic fabrication which is capable of handling non-planar working surface, e.g., comprising irregular topography, uneven surfaces, incline surface, curvilinear surfaces, surface with compound curves, and/or undulating surfaces, and the like. In some embodiments, the present disclosure provides for adaptive robotic fabrication configured to produce consistent and repeatable results in non-planar working surface.

In some embodiments, the present disclosure provides for real-time material removal detection tools for automated stonework, e.g., to predict the outcome of robotic carving. Based on this simulation, real-time analysis of the material state can be performed to evaluate the process and outcome.

In some embodiments, the present disclosure provides for enhancing adaptive robotic fabrication, based on an ability to alternate seamlessly between carving techniques within a single session, and/or use multiple tools within a single fabrication session, allowing to achieve a finer surface finish in relation to what is attainable using a single tool.

Overview of Automated Stone Working Methods

Stone working, in general, involves a host of surfacing, carving, texturizing, cutting, and shaping operations with the goal of producing a desired stone surface treatment. Traditionally, treatment of stone surfaces has been largely restricted to the use of manual techniques for accomplishing the desired stone surface Despite the efforts to digitize stonework, high-skill manual tasks cannot yet be fully automated. There is a continued demand for skilled stone craftsmen for custom stone carving, for finishing, detailing, and fitting elements. In parallel, the need for autonomous manufacturing is rising. This need stems both from the diminishing number of craftsmen able to perform custom tasks and from the need to address safety aspects. Robotic manufacturing can aid in addressing these challenges through remote autonomous fabrication. Robotic tools can allow more sensible and sustainable material-cycles in construction at large. These can also be applicable to hazardous sites, inaccessible locations, as well as deployed during states of emergency with limited availability of resources and labor. Robotic tools and autonomous protocols can augment the sensibility and the skill of craftsmen and increase the resilience of future construction.

In some embodiments, the present disclosure provides for devices, systems, methods, and computer program products for surfacing, carving, shaping, dressing and/or detailing stone surface, e.g., one or more surfaces of a dimensioned stone block or slab, by employing an automated adaptable strategy for transferring patterns associated with manual stonework into the automated robotics domain.

As skilled craftsmen diminish in number, digital fabrication methods demonstrate the potential to form new links between computational tools, robotic systems, and craftsmanship. As many high-skill tasks have not yet been fully automated, there is a continued demand for skilled craftsmen for performing complex stonework tasks such as carving delicate features or three-dimensional patterns.

The fundamental role of craftsmen in manufacturing processes lies in their ability to directly negotiate materials and dynamically adapt to handle conditions arising from the inherent uncertainty of the materials being worked on. Craftsmen make decisions in real-time based on visual and haptic feedback, as illustrated in FIG. 1A.

Accordingly, in some embodiments, a system of the present disclosure seeks ways to dynamically modulate and adapt automated robotic stone surfacing action according to the changing material conditions. Such adaptive manipulation calls for augmenting the robotic capability and modify its behavior in real-time while operating on the material. Enabling adaptive stone surfacing requires to capture the sensitivity of the human gesture in the framework of automated construction.

Stone presents a particularly complex substrate to handle, because it is a heterogenous material having an irregular topography and uneven, coarse texture. Therefore, applying force upon it results in an unpredictable outcome. The core of stonework lies in the sensitivity applied by the craftsmen in using stone surfacing tools. This sensitivity allows the craftsman to respond differently to the unpredictability presented by each stone. This form of unpredictability is manually dealt with through a continuous decision making process and motion-adjustments. In robotics, such unpredictable conditions are defined as a high degree of uncertainty.

The current manufacturing of architectural stone products begins with quarrying, followed by transportation to the factory, stone machining, and finishing. Stone machining refers to the process of producing standard dimensioned stone elements for, e.g., cladding, flooring, and curbing in various shapes and finishes.

Known automated stone working production techniques include, e.g., CNC milling, sawing, and/or surface texturing and carving. However, these methods focus on specific stone production features, and cannot encompass the full breadth of manual stonework capabilities.

In contrast, the present disclosure incorporates adaptive fabrication methods which rely on material feedback for a robotic response. In some embodiments, the present disclosure employs the recording, categorization, and analysis of human actions towards their translation into operative robot control schemes, as well as real time feedback to modulate fabrication operations. In combination, these approaches enable adapting the operation of a fabrication tool in response to material behavior, as well as defining the conditions in which this adaptivity takes place, based on simulated human handling.

Stone Surfacing Motion Plans for Robotic System

Figure 1B:
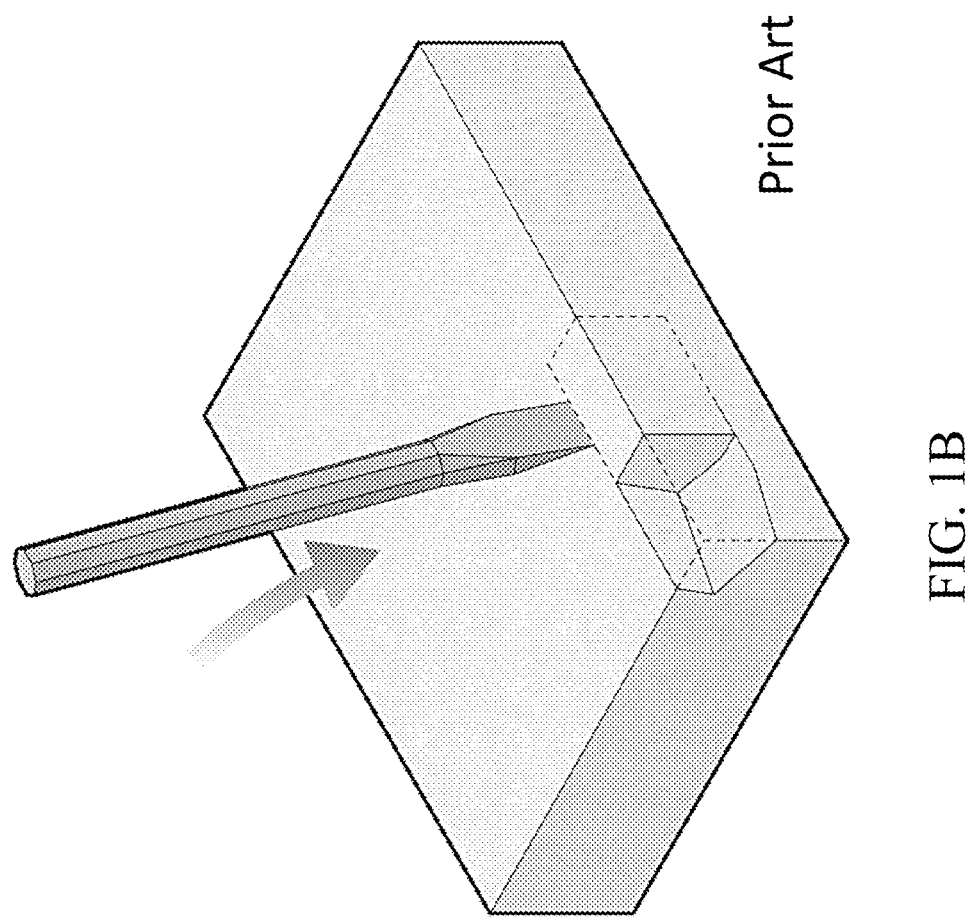
FIG. 1B shows iterative fabrication processes employing multiple repetitions of fabrication plans based on periodic evaluation of the state of the working surface following a previous iteration.

As noted above, manual fabrication overcomes working surface uncertainty by performing real-time decision-making based on visual and haptic feedback. The manual adaptation is not based on a predetermined plan, but rather it is a real-time response to changing environmental and material conditions. In light of this, performing adaptive carving requires equipping the robot with real-time tool path generation capacity assisted by sensory feedback. However, because stone typically reacts in non-predictive ways to subtractive manufacturing operations, the present disclosure further implements iterative fabrication processes employing multiple repetitions of fabrication plans based on periodic evaluation of the state of the working surface following a previous iteration. With reference to FIG. 1B, this emulates manual stone working processes, wherein the stone-carver evaluates the results of a previous action, e.g., the amount and location of the subtracted material following a carving action, and adapts the tool position for the subsequent action.

Specifically, the physical unpredictability of stone poses a challenge to current robotic fabrication research regarding:
The amount of material removed by each tool stroke;
the resulting geometry of a tool stroke; and
potential failures of operations due to variations in material compositions, etc.

Figure 1C:
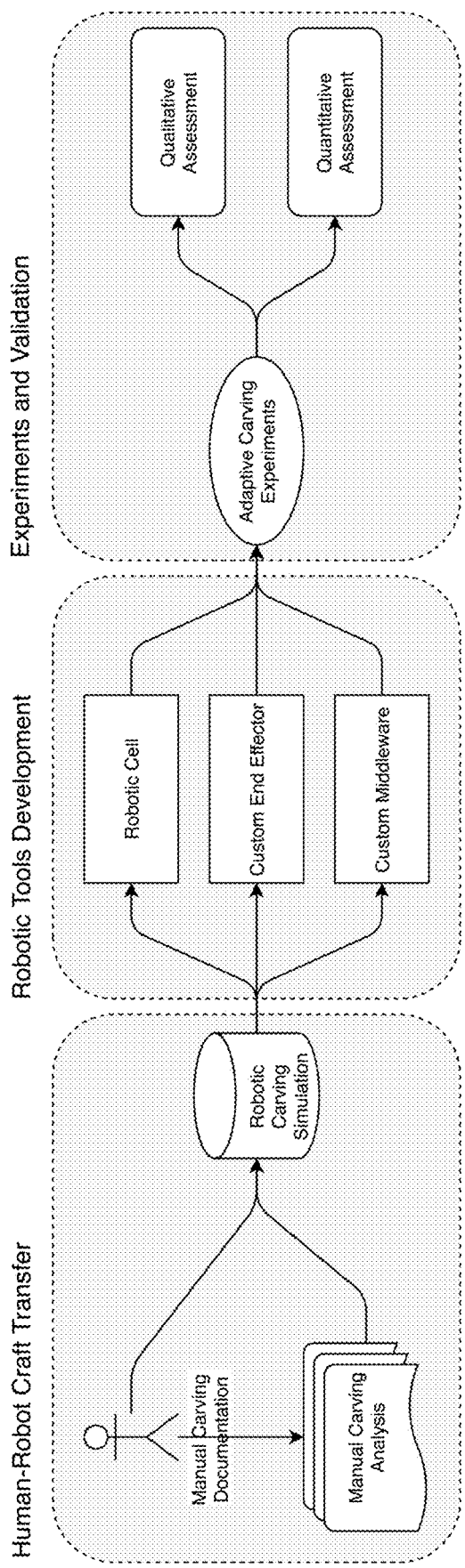
FIG. 1C shows a research method for performing adaptive robotic carving, in accordance with some embodiments of the present disclosure.

With reference to FIG. 1C, the present disclosure provides for the following main stages:
Human to robot craft transfer: This process enables the translation of manual stone carving operations to robotic fabrication instructions. This is crucial in stone carving, because each fabrication operation is typically the result of multiple individual carving actions, where action embodies a modulated response to the results of a previous action. Accordingly, this process may be achieved by:

Manual carving documentation: Performing digital documentation of multiple manual stone carving techniques using motion capture;
manual carving analysis: conducting a quantitative analysis of each documented technique, to derive the parameters of the carving action throughout the entire session; and
robotic carving simulation: a carving simulation of the distinct subtractive effects as the basis for the robotic carving. This stage concludes with gathering the analyzed documented data into robotic fabrication instructions.

In some embodiments, the present method may provide for modulation and/or adjustment of technique using a single tool in the course of a single fabrication session. In some embodiments, the present method may provide for adaptive robotic carving combining several tools and techniques in an iterative fabrication process.

In some embodiments, human-robot craft transfer according to the present disclosure consists of recording the stone working technique using, e.g., motion capture techniques. In some embodiments, the present process is focused on capturing motions associated with a series of carving operations or actions. Thus, the present process is able to evaluate inter-operation dependency and the adjustments made by the worker in response to evaluating the results of previous actions. For this purpose, a motion capture set-up may be adapted for documenting the gestures of a manual craftsman at work, using, e.g., variety of imaging devices and modalities. Accordingly, in some embodiments, the present disclosure provides for recording of manual stone surfacing operations comprising a series of tool actions by a manual operator. In some embodiments, the recording may combine a plurality of sensing modalities, including, e.g., motion capture cameras and force-feedback sensors, to allow collecting fabrication data simultaneously with the performing of the carving operation. In some embodiments, motion-capture cameras are used to track the position and orientation of, e.g., a tracking device or adapter applied on the carving tools and workpiece. This allows to stream and reconstruct in real-time in the digital design environment the carving operations and toolpath sequence that generated them.

In some embodiments, captured techniques may comprise, e.g., coarse carving using a point chisel; delicate carving, using a toothed chisel; and/or rusticated dressing, using a flat chisel or a pitching tool. The capture set up may comprise, e.g., a motion tracking adapter configured for tracking to spatial motion of the tools. In some embodiments, carving parameters captured per fabrication sessions may include, but are not limited to, parameters associated with the spatial position, orientation, and trajectory of the tool throughout each fabrication session, such as overall duration (sec), stroke numbers, number of strokes/sec, average entry angle, average exit angle, average carved area, total carved area, carved area/sec, tool angle, and tool speed (m/s).

Figure 1D:
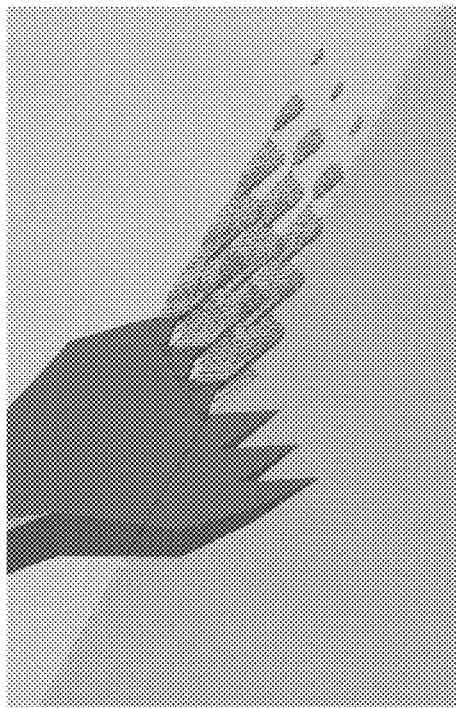
FIGS. 1D-1E show fabrication sessions as be reconstructed in 3D.
Figure 1D:
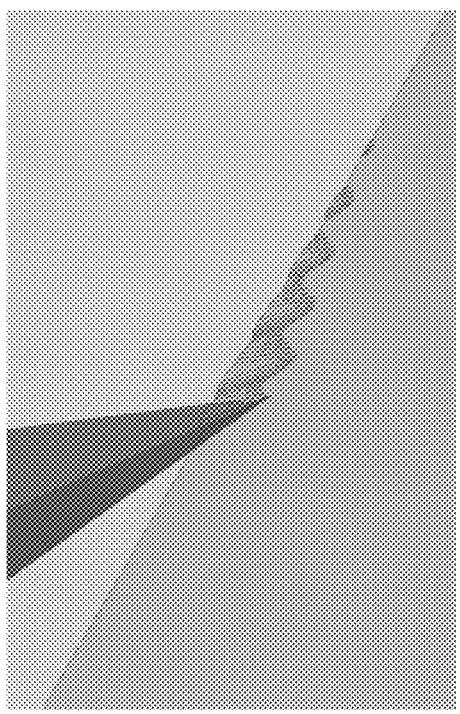
Figure 1D:
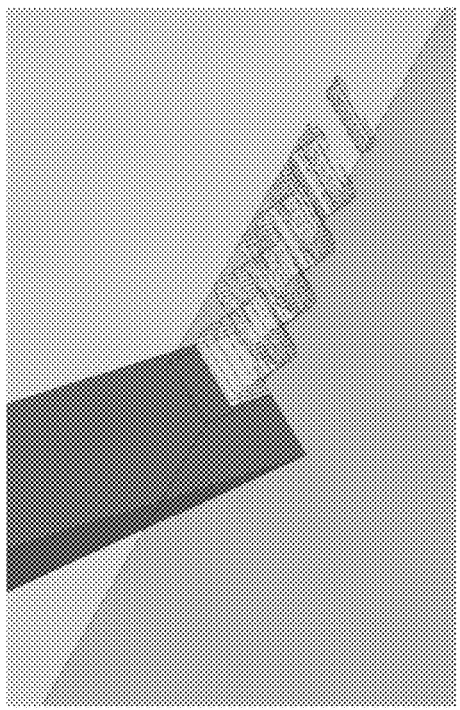

The documentation phase provides an initial database for analyzing the documented techniques. The data includes all analyzed parameters associated with spatial the position, orientation, and trajectory of the tool throughout each fabrication session, based on a specified frame rate (e.g., 100 fps). Based on this data, the three fabrication sessions may be reconstructed in 3D, as illustrated in FIG. 1D. This reconstruction allows to examine the toolpath and to derive the specific carving parameter for transferring the manual action into robotic instructions, as shown in Table 1.

TABLE 1

Manual carving documentation analysis.

| Technique/<br>Chisel Type | A - Coarse/<br>Point | B - Delicate/<br>Tooth | C -<br>Rusticated |
|---|---|---|---|
| Duration (Sec) | 30 | 30 | 30 |
| Stroke Number | 24 | 34 | 14 |
| Stroke/Sec | 0.8 | 1.13 | 0.47 |
| Entry Angle (Avg.) | 77.68 | 54.93 | 73.61 |
| Exit Angle (Avg.) | 37.08 | 41.66 | 35.47 |
| Carved Area (Sq. cm) | 18.68 | 26.83 | 10.81 |
| Carved Area/Sec | 0.62 | 0.9 | 0.36 |
| Chisel Angle | 68.11 | 54.93 | 70.68 |
| Speed (m/s) | 0.05 | 0.33 | 0.07 |

In some embodiments, the parameters include the tool orientation, entry and exit angles, and stroke speed. Additionally, this information provides a quantitative measure for evaluating the robotic protocol.

Figure 1E:
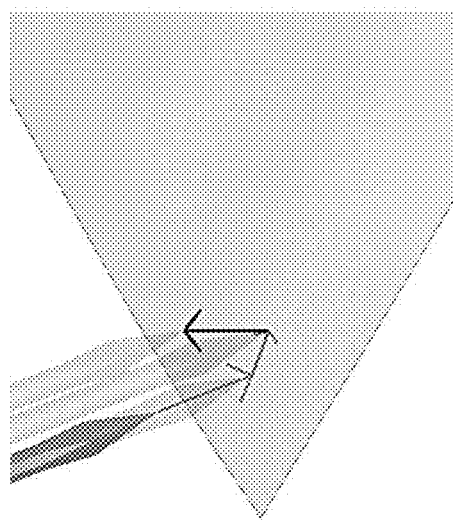
Figure 1E:
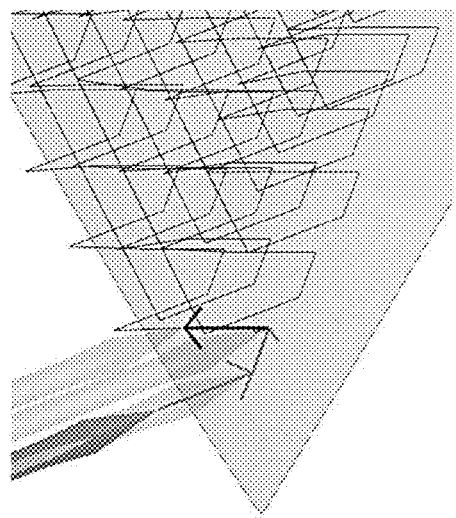
Figure 1E:
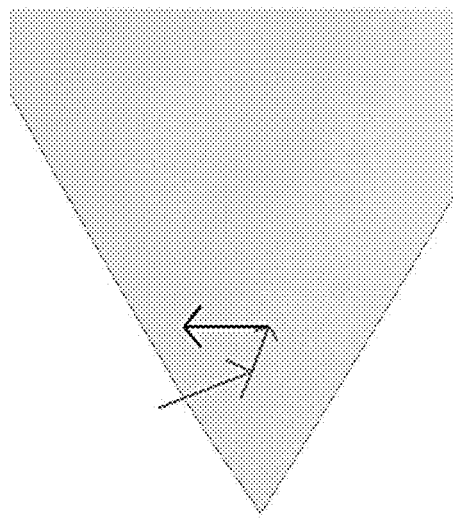

The robotic carving simulation translates the data gathered in the documentation and analysis of manual stone carving techniques to robotic fabrication instructions. To this end, a custom set of components may be developed to simulate the motion of the robotic tool and the outcome of the carving end effector action on the material. As each tool produces a distinct subtractive effect on the surface, three simulation models were developed, as can be seen in FIG. 1E, wherein a horizontal robot motion is combined with a vertical tool motion on the surface. This simulation includes the translation of the carving profile to a robotic toolpath, and its application according to the specific element size. The toolpath takes into account tool position and orientation in space throughout the fabrication session, as well as the carving trajectory.

In some embodiments, following a recording session, a photogrammetric reconstruction of the session is performed to generate a precise 3D model of the material outcomes and extract relevant features.

In some embodiments, an iterative stone working method of the present disclosure may comprise calculating a subsequent fabrication session comprising a plurality of fabrication steps, based on comparing a current 3D model of the working surface (which represent results of a preceding fabrication session) with a target model.

In some embodiments, results of a fabrication session may be affected by one or more of unsteadiness of a robotic manipulated tool, varying density and mass of a material, and/or possible set-up and TCP (tool center point) calibration inaccuracies. Accordingly, in some embodiments, each subsequent fabrication session comprises evaluation of In some embodiments, captured stone surfacing data may be used to train a machine learning model to dynamically adjust and/or module tool operational parameters in a robotic system based, at least in part, on continuously acquired data during the surfacing operation. In some embodiments, the training of a machine learning model of the present disclosure allows collecting quickly and efficiently information on how to operate a tool with a specific material, as mediated by human experience acquired throughout the years, to and provide a strong foundation to inform robotic fabrication tasks with a similar set of non-standard fabrication tools and wood species.

In some embodiments, a trained model of the present disclosure may provide guidance for autonomous robotic training sessions, efficiently narrowing down the search space through the definition of domain boundaries in the selected features rather than arbitrary defining an operational range. Accordingly, a trained machine learning model of the present disclosure may provide for a space of correlations between fabrication parameters and carved geometries. In some embodiments, a trained 1 model of the present disclosure may provide for generating robotic toolpaths to fabricate desired geometries, and/or optimizing fabrication parameters.

Stone Surfacing Robotic End Effector

Figure 2A:
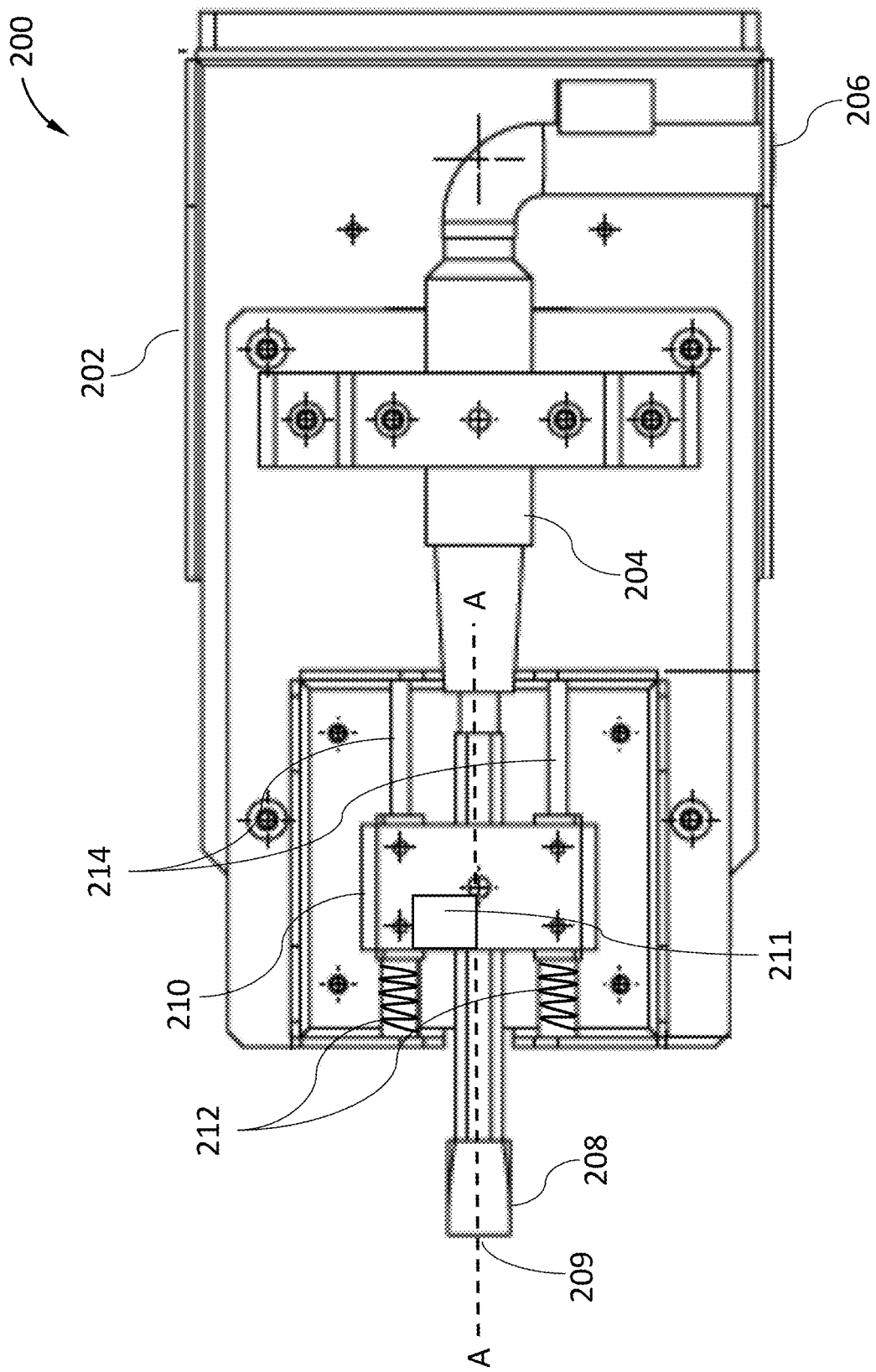
FIGS. 2A-2C are top, side, and perspective illustrations, respectively, of an exemplary stone surfacing robotic end effector, in accordance with some embodiments of the present disclosure.
Figure 2B:
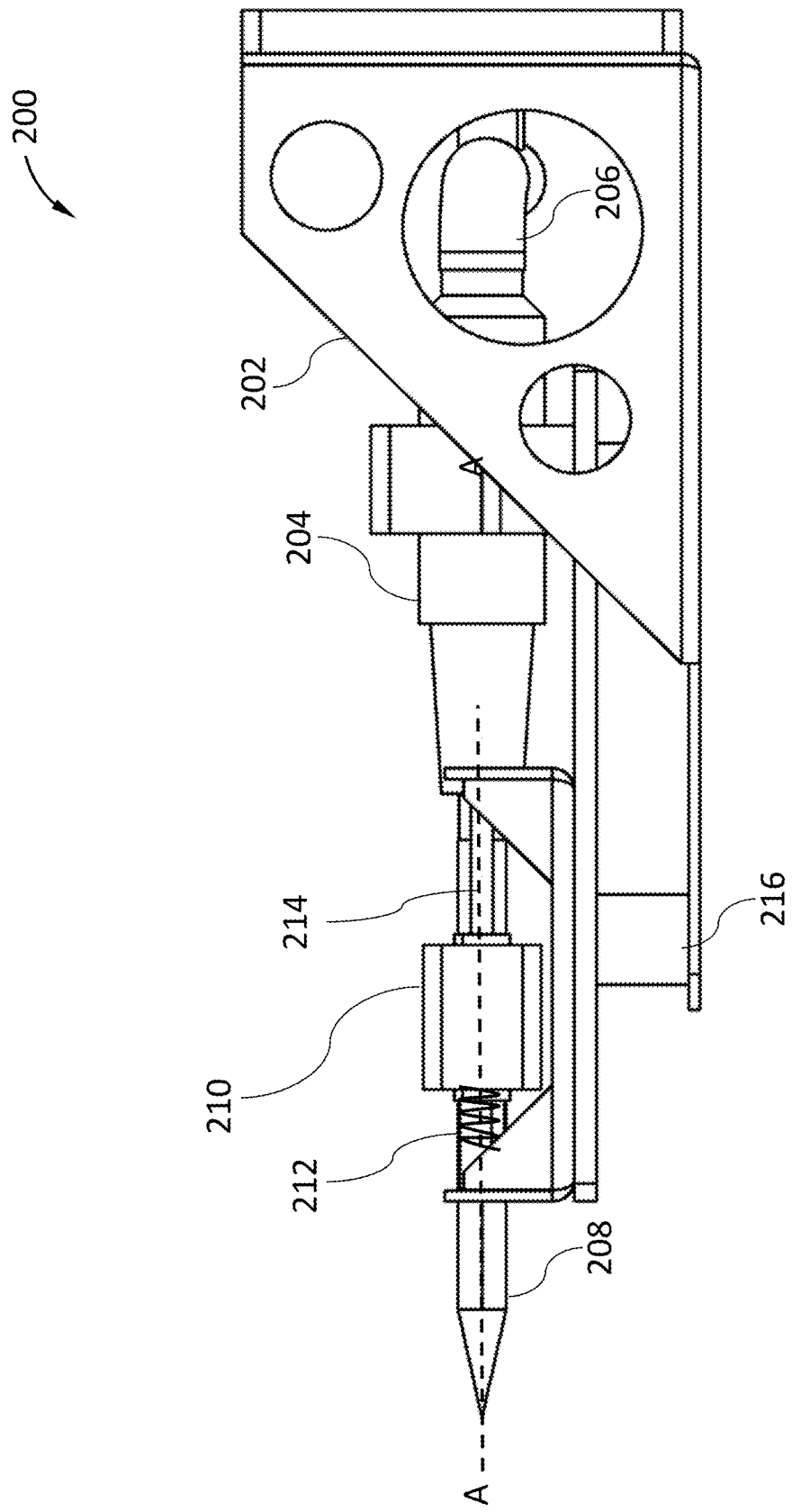
Figure 2C:
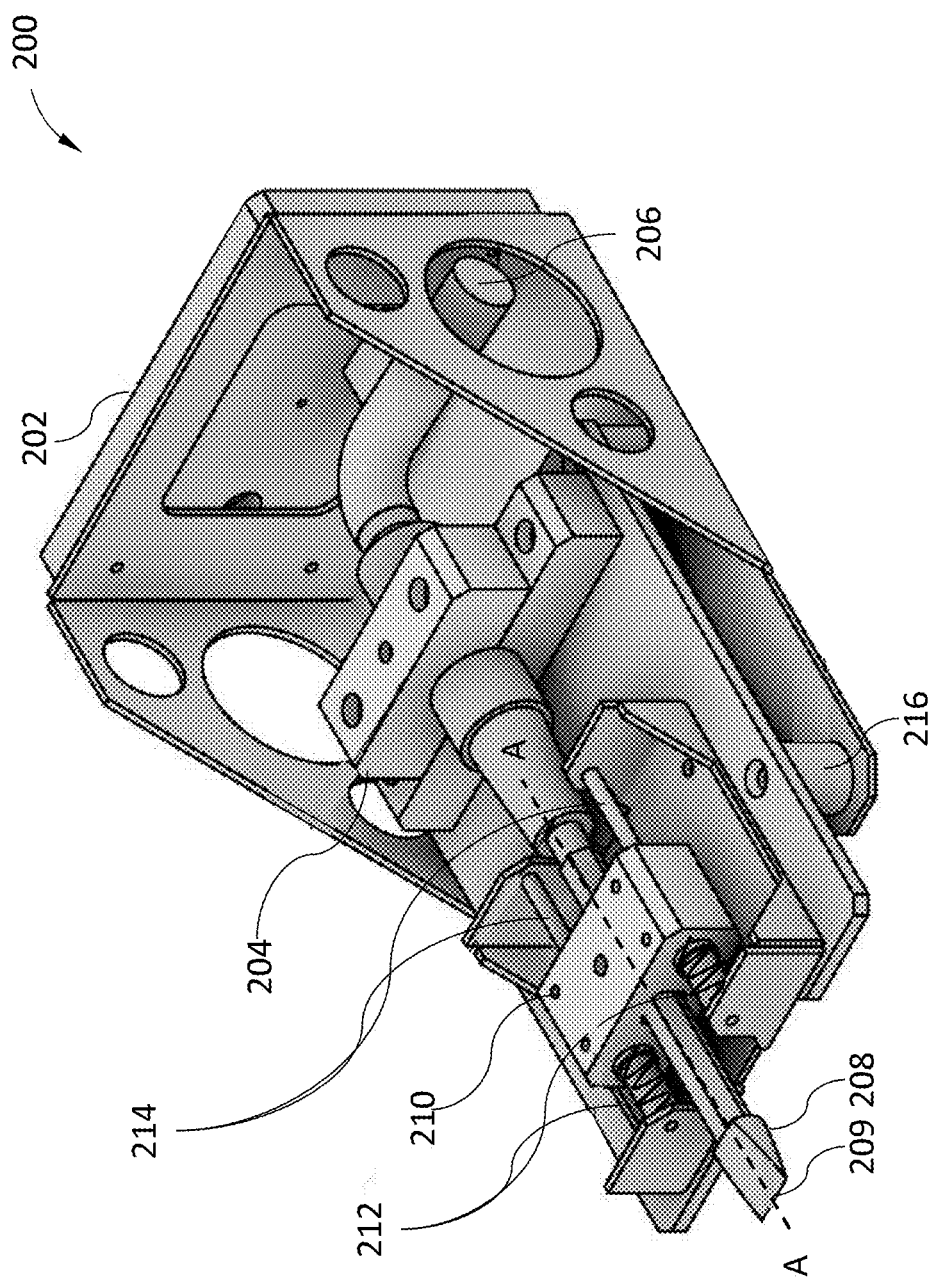

FIGS. 2A-2C are top, side, and perspective illustrations, respectively, of an exemplary stone surfacing robotic end effector 200, in accordance with some embodiments of the present disclosure.

In some embodiments, end effector 200 comprises:
(i) A bracket or housing 202 adapted to be coupled to a distal end of a robotic arm;
(ii) a tool holder 204 disposed within bracket 202, and configured for changeably receiving and holding a suitable stone working tool 208, e.g., a chisel;
(iii) a driving element 206 for driving the tool received within the tool holder distally, in a series of power strokes in an axial direction along axis A-A, e.g., by means of pneumatic pressure, electro-mechanical, or another source of power; and
(iv) a guiding element 210 (e.g., reciprocating alignment element) configured to receive tool 208 therethrough in a lockable engagement. Element 210 may be configured to reciprocally slidingly travel along the axial direction of axis A-A, e.g., on axial guide rails such as rails 214. Thus, element 210 is configured to axially guide the reciprocating motion of tool 208 along axis A-A, so as to ensure a continuous alignment of tool 208 in the axial direction along axis A-A. In some embodiments, element 210 is configured to resiliently axially return tool 208 to its initial proximal position after each power stroke, e.g., by means of one or more resilient elements 212, which may be metal springs or similar elements such as pistons.

In some embodiments, tool holder 204 may be configured for changeably receiving a variety of stone surfacing tools, such as the tools illustrated in FIG. 1D. In some embodiments, toll holder 204 supports easy tool change in response to various fabrication scenarios. Optionally, the chisel type is chosen by the desired subtractive effect on the working surface.

In a nonlimiting example, driving element 206 may include an electric motor and one or more gear assemblies mechanically connected to tool holder 204 for driving the tool received within tool holder 204 distally, in a series of power strokes in an axial direction along axis A-A. In another nonlimiting example, driving element 206 may include a pneumatic piston mechanically connected to tool holder 204 and a pressurized gas source (e.g., tank), for providing pressurized gas to the piston.

In some embodiments, end effector 200 further comprises one or more shock absorbers 216 configured to absorb forces, vibrations, and/or shocks generated in connection with the power stroke impact, and prevent them from being transmitted to the robotic arm.

In some embodiments, end effector 200 may comprise one or more sensors 211. In some embodiments, end effector 200 may comprise, e.g., a distance sensor configured to measure a distance between a tip 209 of tool 208 and a working surface, which may be used to actuate end effector 200 upon reaching a specified distance threshold from the working surface. In some embodiments, end effector 200 may comprise other sensors, such as, proximity sensors, movement sensors, accelerometers, pressure sensors and the like. The sensors may coupled to the system or may be external to the system. For example, proximity sensor may be physically attached to end effector 200 or may be located in the surrounding of end effector 200, in a distance capable of measuring the distance between a tip 209 of tool 208 and a working surface.

Adaptive Robotic Stone Surfacing System

Figure 3A:
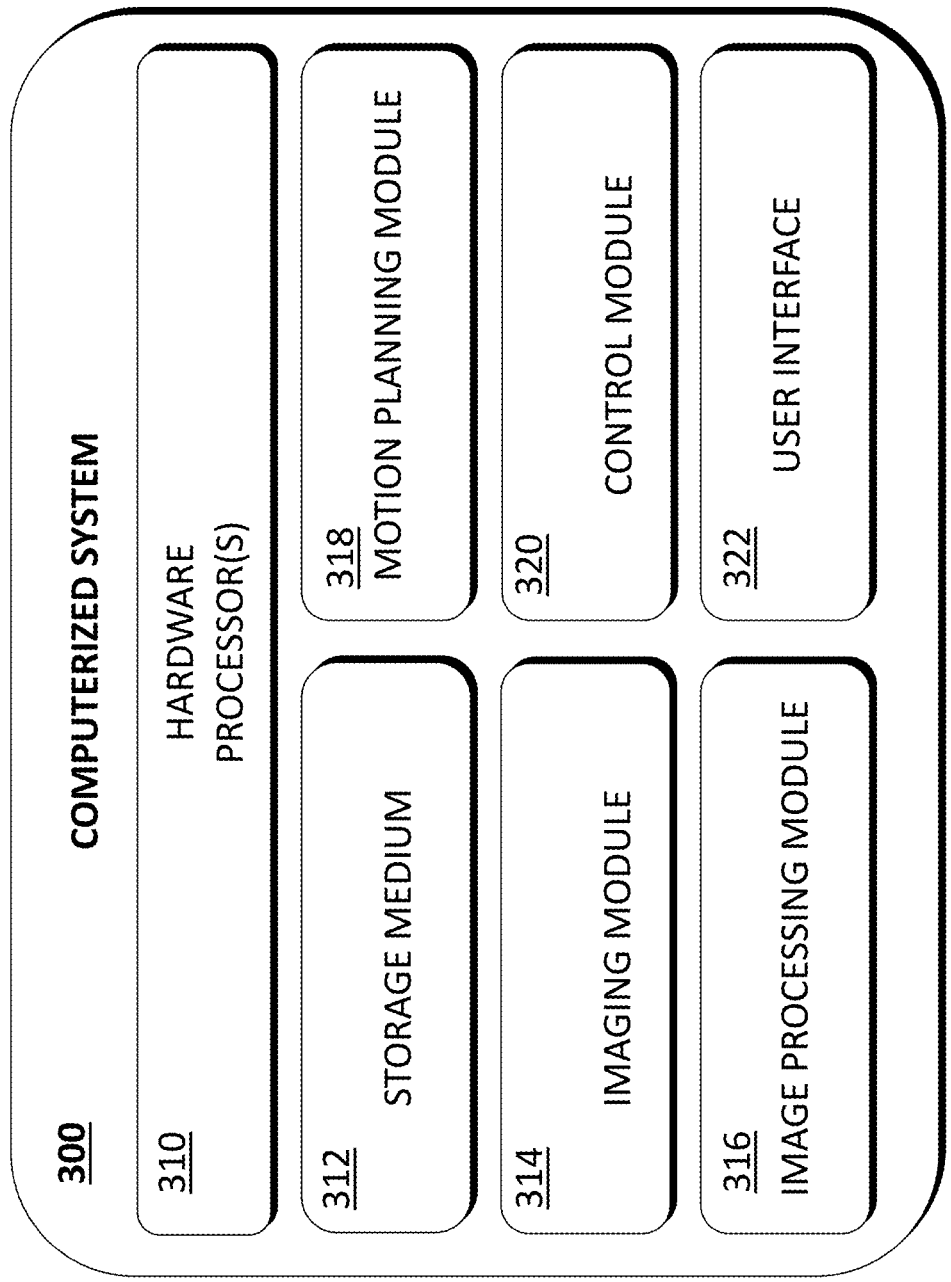
FIGS. 3A-3B are schematic illustrations of an exemplary system for automated adaptable stone working, in accordance with some embodiments of the present disclosure.
Figure 3B:
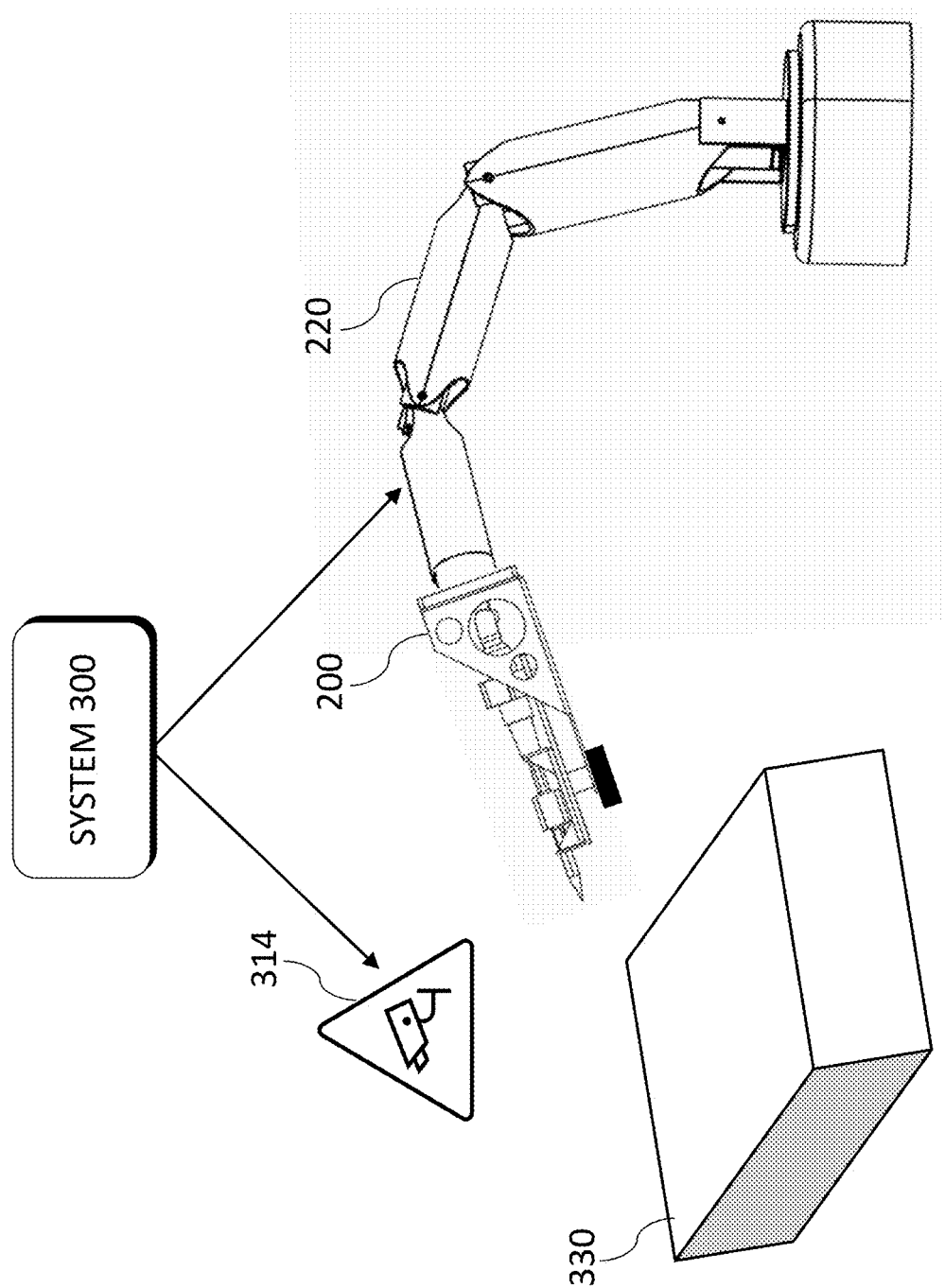

FIGS. 3A-3B are schematic illustrations of an exemplary system 300 for automated adaptable stone working, which may incorporate the stone-working end effector of the present disclosure as detailed hereinabove.

In some embodiments, system 300 is configured for operating and controlling a robotic cell comprising a robotic arm configured to manipulate the end effector of the present disclosure, based on one or more motion plans. In some embodiments, an adaptive robotic carving system 300 of the present disclosure may comprise:

(i) a robotic cell consisting of an industrial arm;
(ii) an end effector of the present disclosure supporting easy tool change in response to various fabrication scenarios;
custom middleware for adaptive carving employing continuous material sensing enabled by data exchange between the end effector and the sensors;
(i) a motion plan module for calculating one or more motion plans based on a target working surface model and the generated 3D model; and
(ii) a control module for operating the robotic arm to carry out the one or more motion plans.

System 300 as described herein is only an exemplary embodiment of the present invention, and in practice may have more or fewer components than shown, may combine two or more of the components, or a may have a different configuration or arrangement of the components. The various components of system 300 may be implemented in hardware, software, or a combination of both hardware and software. In various embodiments, system 300 may comprise a dedicated system or may form an addition to or extension of an existing system.

In some embodiments, system 300 may comprise hardware processor(s) 310, storage medium 312, imaging module 314, image processing module 316, motion planning module 318, control module 320, and user interface 322.

System 300 may store in a non-volatile memory thereof, such as storage medium 312, software instructions, or components configured to operate a processing unit (also "hardware processor," "CPU," or simply "processor), such as hardware processor 310. In some embodiments, the software components may include an operating system, including various software components and/or drivers for controlling and managing general system tasks (e.g., memory management, storage device control, power management, etc.) and facilitating communication between various hardware and software components.

Imaging module 314 may be configured to continuously or periodically acquire images of a working surface 330 being treated by the effector 200 using robotic arm 220. Imaging module 314 is broadly defined as any device that captures images and represents them as data. Imaging devices may be optic-based, but may also include depth sensors, radio frequency imaging, ultrasound imaging, infrared imaging, and the like. In some embodiments, imaging module 314 may be configured to detect RGB (red-green-blue) spectral data. In other embodiments, imaging module 314 may be configured to detect at least one of monochrome, ultraviolet (UV), near-infrared (NIR), and short-wave infrared (SWIR) spectral data.

In some embodiments, imaging module 314 may be a wide field-of-view depth camera which enables a real-time machine vision for 3D reconstruction.

Image processing module 316 may be configured for processing the acquired images to generate continuously or periodically a 3D model of the working surface. The software instructions and/or components operating hardware processor 310 may include instructions for receiving and analyzing by image processing module 316, image data captured by imaging module 314. For example, image processing module 316 may receive one or more images and/or image streams from imaging module 314 and apply one or more image processing algorithms thereto. In some embodiments, the image processing module comprises one or more algorithms configured to perform processing in images captured by the imaging module 314 using any suitable image processing or feature extraction technique. In some embodiments, image processing module 316 provides a point cloud of surface 330, which may then be converted into a 3D surface model.

In some embodiments, motion planning module 318 may be configured for generating one more robotic toolpath plans to implement a desired fabrication plan based on, e.g., a received target model and a generated current 3D model of working surface 330. In some embodiments, motion planning module 318 comprises a middleware layer, e.g., software layer residing between the robot operating system and software applications, which bridges the software and the robotic tool, assisting in sensor-integration, and simplifying the fabrication protocol set-up. The middleware includes all the necessary tools to collect and stream real-time data in order to process and execute robotic actions and operations on the material.

In some embodiments, control module 320 is configured to generate a set of instruction to execute a robotic toolpath plan generated by motion planning module 318.

In some embodiments, a user interface 322 of system 300 comprises a display monitor, a control panel for controlling system 300, and a speaker for providing audio feedback.

In some embodiments, an adaptive robotic system of the present disclosure is able to react to new information acquired in real-time, during the actual fabrication process. In some embodiments, such a system relies on information from imaging and/or sensors and feedback processes that can react and calculate new instructions for the robotic system on run-time.

Experimental Results

The present inventors have conducted studies incorporating the present system, e.g., exemplary system 300 in FIGS. 3A-3B.

A first study attempted to produce a surface effect on a stone that gradually transitions between two distinct face finishes—delicate and coarse.

Figure 4A:
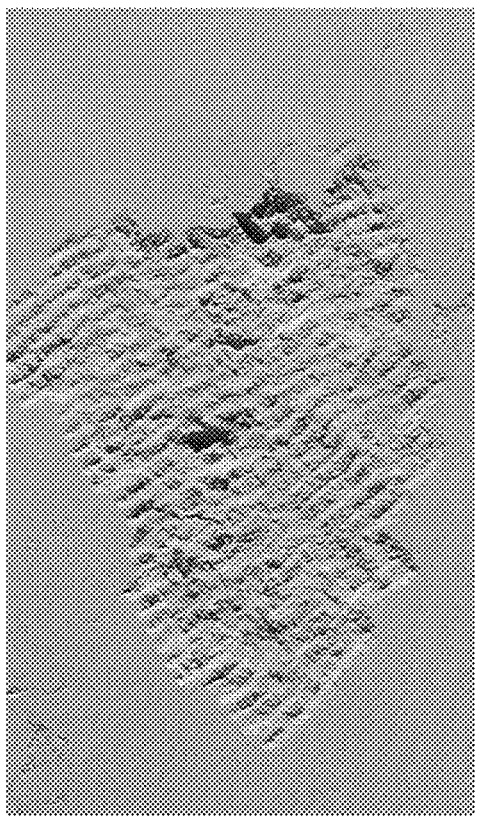
FIG. 4A illustrates documentation of traditional carving techniques, in accordance with some embodiments of the present disclosure.
Figure 4A:
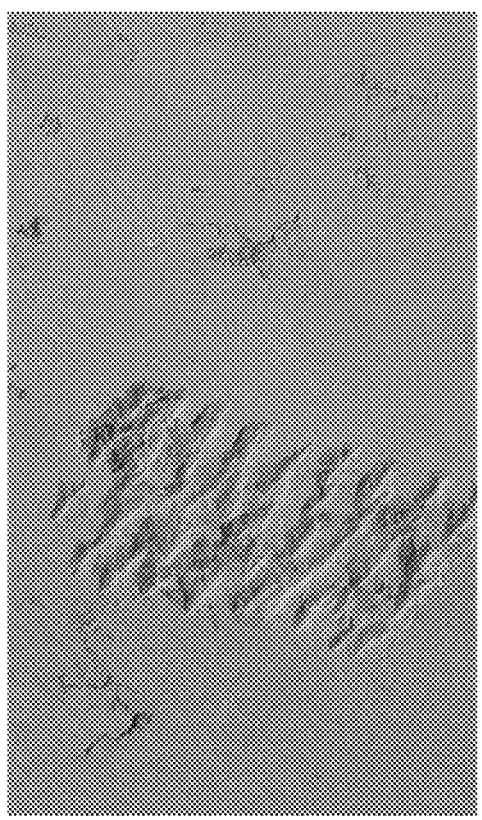
Figure 4B:
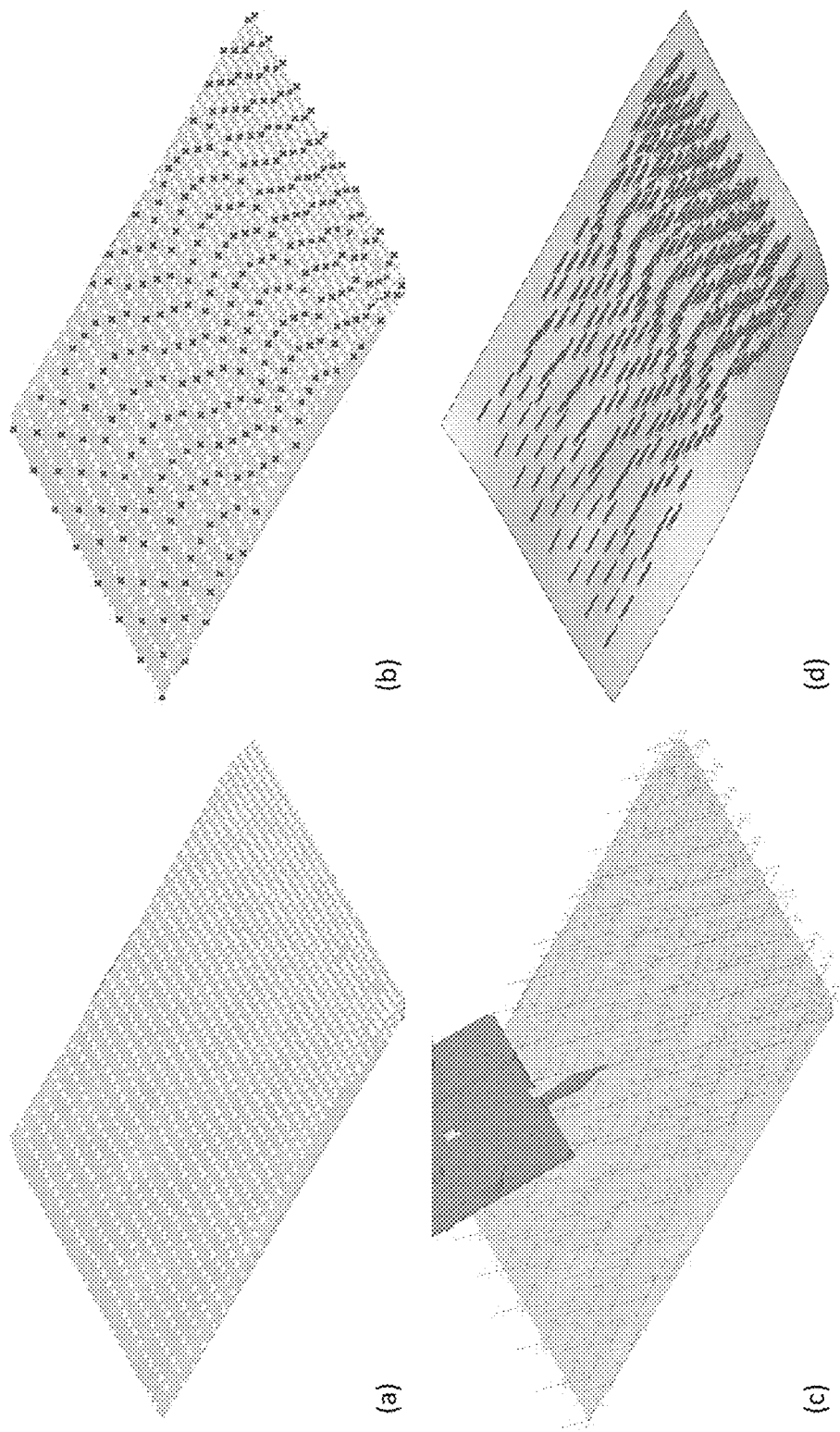
FIG. 4B illustrates a projection of robot motion commands onto a working surface and a simulation of the outcome of the carving process, in accordance with some embodiments of the present disclosure.

FIG. 4A illustrates the documented traditional carving techniques: delicate and coarse. FIG. 4B illustrates a projection of robot motion commands onto the working surface (panels a-c), and a simulation of the outcome of the carving process (panel d).

To this end, the documentation results were analyzed and translated into robot motion commands, supporting the robotic carving application (FIG. 4B). The information gathered from the manual fabrication session was converted into a parametric carving pattern, which was applied to standard-sized, autoclaved aerated concrete block (AAC). This material behaves similarly to soft stone types and therefore allows the experimental work to not exceed the load limitations of the robot used in the study.

The study was designed to produce a gradual transformation on the surface, starting with a narrow and shallow subtraction on one end of the surface, and a wider and deeper subtraction toward the other end. Based on the simulation model, the expected outcome was protrusions ranging from 3 mm in width and 2 mm in depth (delicate), to 15 mm in width and 12 mm in depth (coarse).

The end effector set-up employed a point chisel measuring ½-inch in diameter. The stone working surface was placed on an X-Y positioning table and scanned to produce an accurate point cloud of the working surface, which was then converted into a 3D virtual model. The carving pattern was then projected onto the virtual model, producing an integrated model. In this model, each stroke within a single carving sequence correlates to an actual 3D coordinate location (X, Y, Z) on the material substrate. This condition prevents the robot from stroking above or beneath the substrate. This correlation is particularly important in heterogeneous substrates, which present a higher degree of uncertainty with regards to the material topology and geometry, and fabrication-model accuracy. Based on the integrated model, specific robot commands were produced and executed in a single fabrication session. The carving speed was set to 0.2 meters per second (10% of the maximum robot linear motion speed of 2 meters per second), approximating the average speed of the documented manual carving. This was done in order to isolate parameters and allow comparing the manual and robot carving in terms of surface finish quality.

Figure 4C:
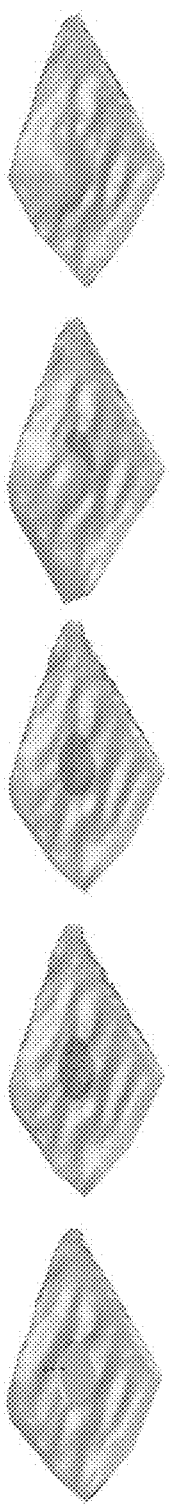
FIG. 4C illustrates a process of updating the integrated model between carving iterations, in accordance with some embodiments of the present disclosure.

A second study conducted by the present inventors expanded the protocol employed in the previous experiment through an adaptive robotic carving process. The objective of this experiment was to produce a circular indented detail on a surface, using the three chisel types. The expected outcome was a subtracted circular detail with a surface area of 78.5 cm². The experiment began with producing a coarse face finish as a basis for subsequent adaptive detailing. Therefore, in addition to projecting the carving pattern on the material, the robot engaged in a continuous process affected by the altered material state following each action, which the integrated model is updated between carving iterations. This approach allows to alter the control flow of the fabrication process and adapt the carving plan to the material behavior. FIG. 4C illustrates a process of updating the integrated model between carving iterations.

The initial end effector set-up employed a point chisel to remove ~80% of the material, and then tool replacement was conducted to employ a tooth chisel. The process concluded with an additional replacement, using the flat chisel to achieve a finer surface finish. As in the first experiment, a point cloud of the surface was produced and converted into a mesh. Then, a carving plan for coarse dressing with a circular indentation was initiated. To this end, a 10-stroke iteration was defined. Following each carving iteration, the geometry was updated, and an additional iteration was performed. This cycle was repeated until the target geometry was achieved. Ultimately, the adaptive fabrication session was performed in 31 iterations, each consisting of 10 chisel-strokes. The fabrication model and respective robot instructions were autonomously updated after each iteration, producing a new carving plan for the following iteration.

The results of the first robotic experiments were compared to the manual session employing image processing for contour detection to evaluate the actual material removal in relation to the simulated model.

Figure 4D:
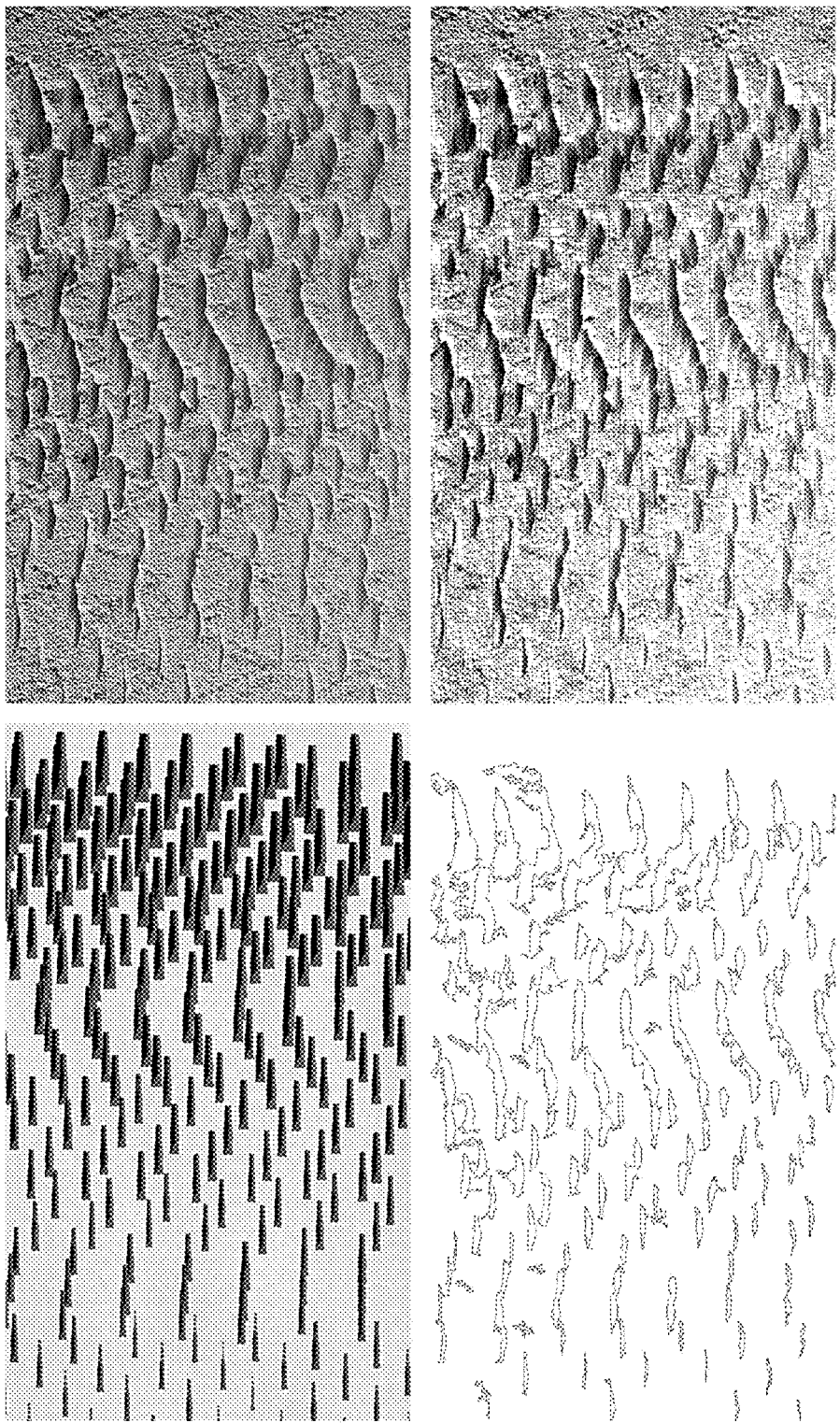
FIG. 4D shows surface simulation and outcome comparison, in accordance with some embodiments of the present disclosure.

FIG. 4D shows the surface simulation and outcome comparison. The left had side panels show computational carving simulation, as predicted by a 3D mesh model. The right hand side top panel shows the resulting material artifact of the robotic carving. The right hand side bottom panel shows a custom machine vision application developed to detect material removal.

In light of this comparison, two main uncertainties emerge. Firstly, the comparison shows that some parts of the pattern are missing, while others are accentuated. This inconsistency is a result of a deviation between the robot Tool Center Point (TCP) and the surface height in relation to the chisel's entry point. The deviation stems from discrepancies between the initial CAD model and the material. Secondly, the outcome presents increased subtraction of material in relation to the simulation. The over-subtraction occurs since the simulation model is based on a representation of a Boolean operation between the 3D chisel model and the surface mesh. However, when force is applied on a brittle material, it results in a subtraction that may the Boolean operation.

In order to reduce the uncertainties presented by the results of the first experiment, the second experiment employed a repeated visual evaluation of the carving outcome as a validation process. The evaluation was performed autonomously by scanning the surface following each iteration using a depth camera. The camera was positioned 50 cm from the substrate, resulting in an accuracy of between 1 mm to 2.5 mm (less than 1% error). The captured point cloud was compared to the target model by measuring the closest point distance between the models. The captured point cloud was sampled down from a maximum resolution of 307,200 to 76,800 points in order to optimize the measurement computation time.

Comparing the target model with the carving outcome scan allows to evaluate the accuracy of the adaptive process. The desired surface area of the subtracted detail was 78.5 cm², while the carved outcome was 78.1 cm².

Figure 4E:
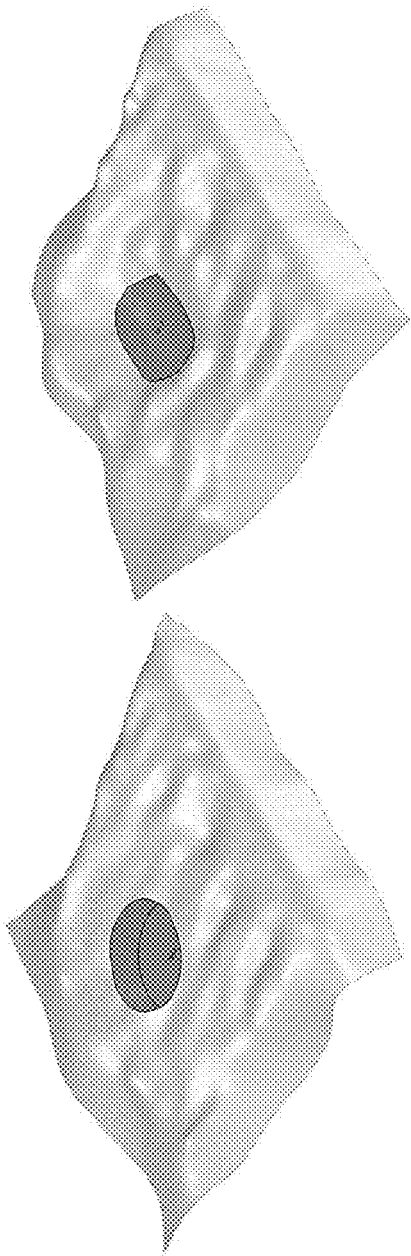
FIG. 4E shows a detailing comparison, in accordance with some embodiments of the present disclosure.
Figure 4E:

FIG. 4E shows the detailing comparison. The point cloud generated mesh model of the first iteration Boolean with the planned target detail (top left). The mesh model of the final iteration highlighting the resulting geometry (top right). The adaptive robotic carving artifact outcome (bottom). This represents a minor area difference of 0.4 cm² (0.5%), a measurement which lies within the scanning margin of error. However, this difference might also reflect the combined effect of the unsteadiness of the pneumatic hammer, the varying density and mass of the material, or possible set-up and TCP calibration inaccuracies.

The first experiment applied a traditional pattern that was parametrically adapted to the tested block size. It exhibits a way to adapt a selected pattern design to alternative substrate size, as well as to create a variable material carving pattern throughout the surface.

The second experiment performed an adaptive fabrication process based on bi-directional information flow between the robot and the designated server. The experiment presents a combination of a coarse surface finish and geometrical detailing, combining two types of subtractive manufacturing on a single surface. The research focused on evaluating the quantitative parameters of the robotic carving.

These parameters were compared to the manual fabrication sessions to evaluate the performance of the robotic fabrication protocols (see Table 2). As the performed carving patterns were not identical, the comparison focused on objective parameters that present relations rather than absolute values. In this context, the robotic session demonstrates a larger carving area per time unit in relation to the manual one. Therefore, with regards to performance, the achieved level of the two experiments surpassed the requirements.

TABLE 2

Robotic fabrication sessions analysis.

| Method | Robotic | | Manual | | |
|---|---|---|---|---|---|
| Experiment | 1 | 2 | A | B | C |
| Duration (Sec) | 30 | 30 | 30 | 30 | 30 |
| Stroke Number | 17 | 9 | 24 | 34 | 14 |
| Stroke/Sec | 0.575 | 0.3 | 0.8 | 1.13 | 0.47 |
| Entry Angle (Avg.) | 78 | 69 | 77.68 | 54.93 | 73.61 |
| Exit Angle (Avg.) | 37 | 38 | 37.08 | 41.66 | 35.47 |
| Carved Area (Sq. | 87 | 41.3 | 18.68 | 26.83 | 10.81 |
| Carved Area/Sec | 2.9 | 1.37 | 0.62 | 0.9 | 0.36 |
| Chisel Angle | 68 | 65 | 68.31 | 54.93 | 70.68 |
| Speed (m/s) | 0.2 | 0.2 | 0.05 | 0.33 | 0.07 |

The presented experiments aimed to evaluate the robotic application of adaptive carving through two manufacturing protocols. The respective protocols were developed based on documentation and analysis of manual stone carving techniques and their respective simulation. The research expands and enhances existing capabilities with regard to three emerging research areas in the field of stone manufacturing, namely digital stonework, simulation, and adaptive robotic fabrication:

As used herein the term "about" refers to ±10%. The terms "comprises", "comprising", "includes", "including", "having" and their conjugates mean "including but not limited to". The term "consisting of means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure. The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

As used herein, the term "substantially" refers to at least 80%, at least 85%, at least 90%, at least 92%, at least 95%, at least 96%, at least 97%, at least 98%, at least 99%, including any range or value therebetween. Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A device comprising:
   a bracket adapted to be coupled to a distal end of a robotic arm;
   a tool holder disposed within said bracket and configured for changeably receiving a first portion of a stone working tool, wherein said tool holder is movable along a single reciprocating axial direction;
   a driving element, disposed within said bracket, for driving said tool holder, inside said bracket, distally along said single reciprocating axial direction during a power stroke of said device; and
   a guiding element comprising one or more resilient elements, connected to said tool holder, for changeably receiving a body portion of said tool and for guiding said tool in said single reciprocating axial direction, wherein said guiding element is configured to slidingly reciprocally travel along said single reciprocating axial direction, and wherein said guiding element is configured to resiliently return said tool proximally along said single reciprocating axial direction after said power stroke.

2. The device of claim 1, wherein said tool is a stone working tool.

3. The device of claim 1, wherein said driving element is one of a: a pneumatic pressure driving element, and an electro-mechanical driving element.

4. The device of claim 1, wherein said guiding element is configured to slide reciprocally on one or more guide rails.

5. The device of claim 1, wherein said guiding element is resiliently supported by at least one resilient element which returns said driving element proximally in said single reciprocating axial direction.

6. The device of claim 1, further comprising one or more sensors selected from the group consisting of: distance sensor, accelerometer, and force sensor.

7. A method comprising:

providing a device comprising:

a bracket adapted to be coupled to a distal end of a robotic arm;

a tool holder disposed within said bracket and configured for changeably receiving a first portion of a stone working tool, wherein said tool holder is movable along a single reciprocating axial direction;

a driving element, disposed within said bracket, for driving said tool holder, inside said bracket, distally along said single reciprocating axial direction during a power stroke of said device; and a guiding element comprising one or more resilient elements, connected to said tool holder, for changeably receiving a body portion of said tool and for guiding said tooling said single reciprocating axial direction, wherein said guiding element is configured to slidingly reciprocally travel along said single reciprocating axial direction, and wherein said guiding element is configured to resiliently return said tool proximally along said single reciprocating axial direction after said power stroke;

coupling said device to a distal end of a robotic arm; and operating said robotic arm according to a set of fabrication instructions, to generate a desired surface pattern on a working surface of a stone article.

8. The method of claim 7, wherein said tool is a stone working tool.

9. The method of claim 7, wherein said driving element is one of a: a pneumatic pressure driving element, and an electro-mechanical driving element.

10. The method of claim 7, wherein said guiding element is configured to slide reciprocally on one or more guide rails.

11. The method of claim 7, wherein said guiding element is resiliently supported by at least one resilient element which returns said driving element proximally in said single reciprocating axial direction.

12. The method of claim 7, further comprising one or more sensors selected from the group consisting of: distance sensor, accelerometer, and force sensor.

* * * * *